United States Patent [19]

Jarmuzewski

[11] Patent Number: 4,552,097
[45] Date of Patent: Nov. 12, 1985

[54] STEAM GENERATOR WITH A STATIONARY FLUIDIZED-BED HEARTH

[75] Inventor: Hans-Georg Jarmuzewski, Oberhausen, Fed. Rep. of Germany

[73] Assignee: Deutsche Babcock Werke Aktiengesellschaft, Oberhausen, Fed. Rep. of Germany

[21] Appl. No.: 693,978

[22] Filed: Jan. 23, 1985

[30] Foreign Application Priority Data

Feb. 21, 1984 [DE] Fed. Rep. of Germany ....... 3406200

[51] Int. Cl.[4] .............................................. F22B 1/00
[52] U.S. Cl. ................................... 122/4 D; 110/245; 165/104.16
[58] Field of Search ............... 122/4 D; 110/245, 263, 110/347; 431/7, 170; 165/104.16

[56] References Cited

U.S. PATENT DOCUMENTS

| 2,842,102 | 7/1958 | Blaskowski | 122/4 D |
| 4,273,073 | 6/1981 | Robinson | 122/4 D |
| 4,336,769 | 6/1982 | Daman | 122/4 D |
| 4,436,507 | 3/1984 | Stewart et al. | 431/170 |
| 4,449,483 | 5/1984 | Strohmeyer, Jr. | 122/4 D |
| 4,453,494 | 6/1984 | Waryasz | 122/4 D |

Primary Examiner—Edward G. Favors
Attorney, Agent, or Firm—Max Fogiel

[57] ABSTRACT

A steam generator arranged as a single-pass boiler with a stationary fluidized-bed hearth and a superimposed ash-circulating system. The fluidized bed is divided into several individually controllable sections to which, in each instance, there is associated a belt-charging machine, an ash separation and ash return system, and a secondary air feed line.

9 Claims, 2 Drawing Figures

STEAM GENERATOR WITH A STATIONARY FLUIDIZED-BED HEARTH

BACKGROUND OF THE INVENTION

The present invention relates to a steam generator having a stationary fluidized-bed hearth.

Such a steam generator is known from the journal, *Chemie-Ingenieur Technik* 51, (1979), No. 3, p. 188. Using this steam generator it is basically possible to run part loads, since individual sections of the fluidized bed can be cut in or out. The known steam generator is arranged as a multi-flue boiler. Some of the sections are provided with evaporator heating surfaces, whereas the remainder are provided with evaporator and intermediate superheater heating surfaces. This boiler configuration makes partial-load control more difficult.

In addition, a steam generator with a fluidized-bed hearth is also known (journal VDI report No. 322, 1978, p. 10), in which coal is supplied evenly by belt-charging machines. The unburned coal particles that are carried off the fluidized bed are subsequently burned above the fluidized bed with the help of secondary air. In this steam generator, the fluidized bed is not divided into sections. The performance of the furnace is controlled by the quantity of combustion air that is used.

Finally, it is known that in fluidized-bed hearths the flue dust carried off by the flue gas is removed and fed back to the fluidized bed.

SUMMARY OF THE INVENTION

It is the object of the present invention to improve a steam generator with a stationary fluidized-bed hearth that is divided into sections that can be activated individually such that, for a high overall performance, partial load control is possible in a simple manner.

In this steam generator, according to the present invention, all the elements are associated with each section of the fluidized-bed hearth and these make it possible to operate this one particular section on its own. This renders partial load control simpler. In the same way, the single-pass construction works in conjunction with the cyclones that remove the flue dust and return it. The combination of several such sections results in a steam generator having a very high overall performance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
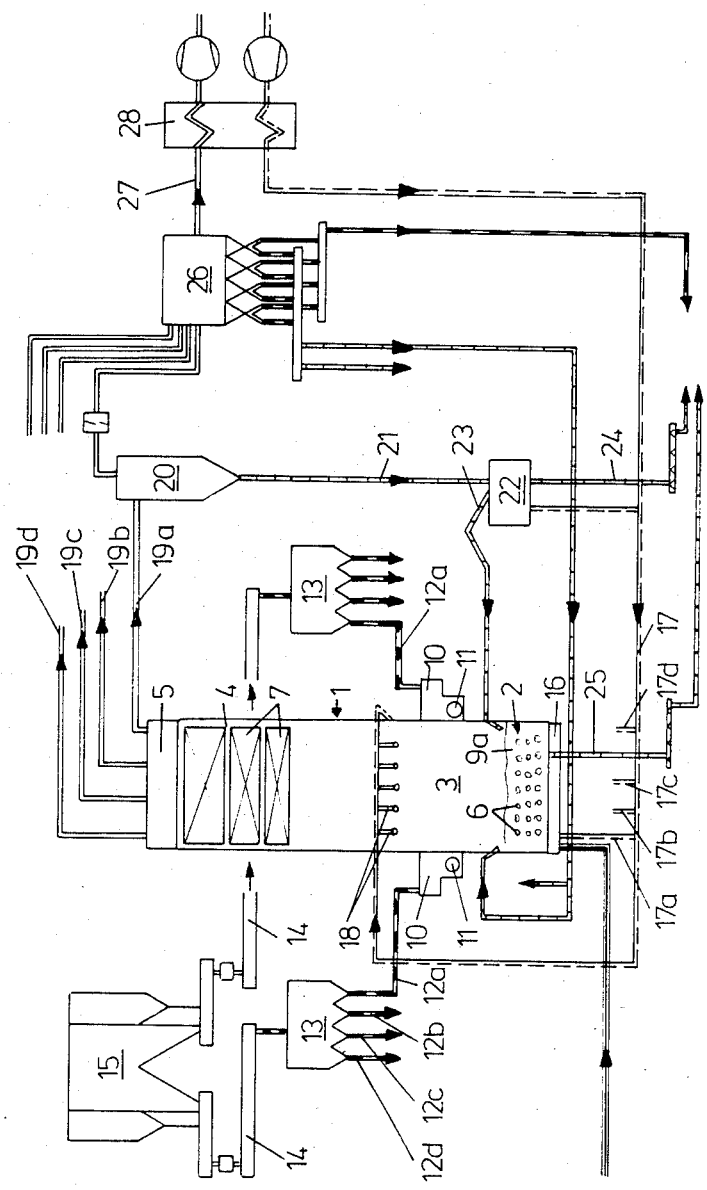
FIG. 1 is a schematic view of a steam generator according to the present invention.

The steam generator 1 that is illustrated is arranged as a single-pass boiler and has a fluidized bed 2 hearth in its lower portion. Above the fluidized bed 2 there is a combustion chamber 3 that is followed by a gas flue 4. This gas flue 4 becomes a gas extractor 5. The walls that enclose the fluidized bed 2, the combustion chamber 3, and the gas flue 4 are formed of tubes welded to each other through flanges so as to be gas-tight. These tubes are controlled as evaporator surfaces. In the area of the combustion chamber 3 the tubes are studded and provided with a fireproof mass. Immersion-type heating surfaces are arranged in the fluidized bed 2 and controlled as superheater heating surfaces. Reheating surfaces are arranged in the gas flue 4, and these constitute the economizer and the intermediate superheater.

The fluidized-bed hearth is arranged as a stationary fluidized-bed. It is divided into sections 9a, 9b, 9c, and 9d by means of partitions 8 that extend as far as the upper edge of the fluidized bed 2. In the case that is shown, there are four such sections. The partitions 8 consist of tube walls that are connected to the boiler system. The bundle of immersion heating surfaces 6 and the reheating surfaces 7 are transverse to the sections 9a, 9b, 9c and 9d.

With regard to the conduct of air, fuel, ash and additives, the sections 9a, 9b, 9c and 9d are separate from each other and can be cut in and out individually. Each section 9 is provided on two opposite sides with a belt-charging machine 10. These belt-charging machines 10 contain coal accelerators 11 that supply the flow of coal from undried and unground coal up to a maximum fragment size of 25 mm from both sides into the fluidized-bed hearth. The spread area of two opposing belt-charging machines 10 matches the cross-section of a section 9.

Each belt-charging machine 10 is connected by its own coal line 12a, 12b, 12c, 12d to a supply bunker 13. There is such a bunker on each side of the draft generator 1, all the belt-charging machines on one side being connected to this bunker. The supply bunkers 10 are supplied by a conveyor-belt and mixing system 14 from a service bunker 15 for coal and chalk.

Beneath the fluidized-bed hearth 2 there is an air box 16 and this is divided into sections 16a, 16b, 16c, 16d in the same manner as the fluidized bed. The air box 16 is separated from the fluidized bed 2 by a cooled bottom through which pass air jets. Each section of the air box 16 is connected to an air trunk 17 through which the sections 9a, 9b, 9c and 9d are supplied with a sufficient quantity of combustion air to maintain the vortex state and near-stoichiometric combustion. Above each section 9a, 9b, 9c, 9d of the fluidized layer 2, there are secondary air feeds in the combustion chamber 3. An air surplus of approximately $n=1.25$ is selected through these secondary air feeds. In this way conditions are created within the fluidized layer by means of which it is possible to achieve a reduced formation of $NO_x$.

Figure 2:
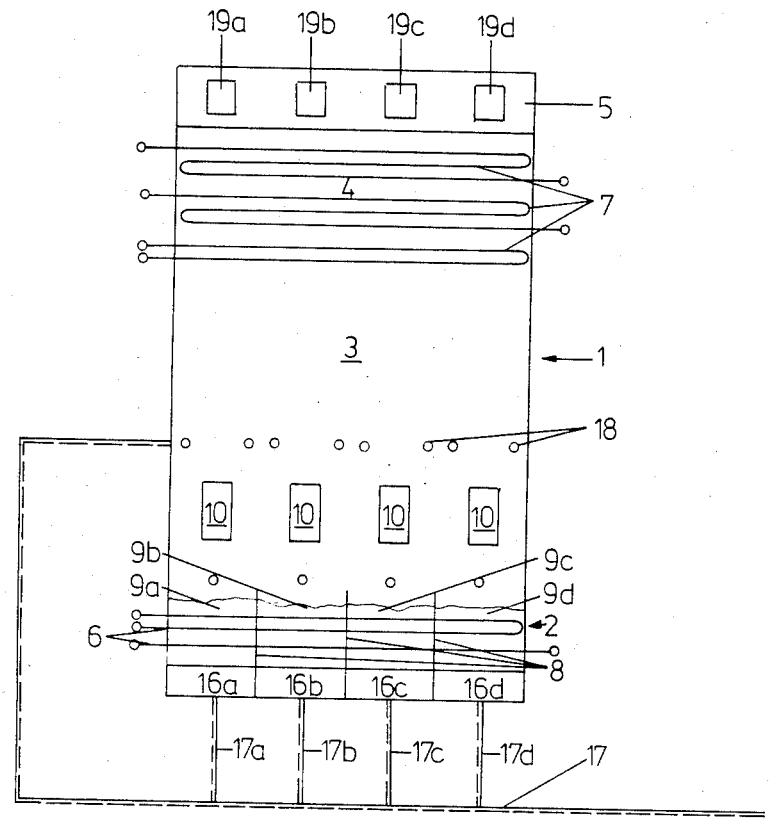
FIG. 2 is a side view of the steam generator shown in FIG. 1.

Above each section 9a, 9b, 9c, 9d of the fluidized bed 2 the gas extractor 5 that is arranged in the upper part of the steam generator 1, has in each instance a gas extractor tube 19a, 19b, 19c, 19d (FIG. 2). Each gas extractor tube 19a, 19b, 19c, 19d passes to a separator, for example, a cyclone 20, within which there is removal of the flue dust picked up by the flue gas, consisting mainly of ash with a residual portion of unburned fuel.

The solid discharge from the cyclone 20 is connected through an ash line 21 to a syphon 22. With the help of air, the ash is returned through a return line 23 to the fluidized bed 2, which is to say, to the section 9a, 9b, 9c, 9d that is associated with the cyclone 20. The return line 23 opens out, in each instance, into the combustion chamber 3 just above the fluidized bed. A portion of the ash is removed from the system through an outlet line 24 that is connected to the syphon 22. In addition to this outlet line, the fluidized bed is also provided with an extractor line 25, through which the fluidized bed can be completely emptied.

The ash line 21 that is connected to the solid discharge from the cyclone 20 can also be connected to the supply bunker 13. In this case, the ash is returned through the belt-charging machine 10 into the section 9a, 9b, 9c, 9d of the fluidized bed which is associated with the cyclone 20.

An ash circulating system, consisting of the cyclone 20, the ash line 21, and the return line 23, is superimposed on the stationary fluidized bed. The total circulating quantity is matched to the type of fuel in use so as to improve overall combustion and the degree to which sulfur is fixed. Low-volatility coal that is hard to ignite and special fuels require a greater total circulating quantity than brown coal, for example. The total circulating quantity is adjusted by the vortex speed within the fluidized bed. If it is not possible to increase the vortex speed, or if an increased vortex speed is undesirable, the cyclones 20 are to be provided with fittings that increase the degree of separation of the cyclones 20. The degree of separation achieved by the fittings is matched to the desired total circulating quantity.

The temperature of the flue gases at the entrance to the cyclone 20 is adjusted to approximately 350° C. This means that the ash is returned to the fluidized bed at a relatively high temperature, so that the particles that consist of ash and unburned fuel have a shorter reheat time than in the case with extensive cooling of the flue gases and thus the ash.

The cyclones 20 are followed by a hot-gas filter 26, which can be an electrostatic filter, a fabric filter, or another type. The dust that is trapped by this filter is either returned to the fluidized bed hearth or discharged. The hot-gas filter 26 is connected through a gas line 27 to an air preheater 28 that has rotating accumulators and is connected to the air line 17.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A steam generator comprising: a stationary fluidizedbed hearth; a combustion chamber and a gas flue containing outlet-side heating surfaces above said fluidized-bed hearth; immersion-type heating surfaces arranged in said fluidized bed; said fluidized bed being divided into a plurality of individually controlled sections; said steam generator comprising further a single-pass boiler; a gas extractor tube and a cyclone connected to said gas extractor tube at the upper end of said boiler above each section of said fluidized bed; said cyclone having discharge means passing cyclone disclosure to a respective predetermined section; belt-charging means associated with each section and having a spread corresponding to the cross-section of a section; and secondary air feeds arranged above each section.

2. A steam generator according to claim 1, wherein gas temperature at an inlet to said cyclone is substantially 350° C.

3. A steam generator according to claim 1, including a hot-gas filter following said cyclone on a gas-flow path; and an air preheater with rotating accumulators following said hot-gas filter.

4. A steam generator according to claim 1, including an ash line leading from the discharge means of the cyclone to said fluidized-bed hearth; and an ash discharge in said ash line means.

5. A steam generator according to claim 1, wherein said combustion chamber comprises circulation tubes with sides facing said combustion chamber; and a fire-resistant mass on said sides of said circulation tubes.

6. A steam generator according to claim 1, wherein at least a part of said immersion-type heating surfaces are controlled as superheaters.

7. A steam generator according to claim 1, wherein said fluidized bed has a superimposed ash circulating system of predetermined quantity matched to a particular fuel in use.

8. A steam generator according to claim 7, wherein total circulating quantity is adjustable through vortex speed within said fluidized bed.

9. A steam generator according to claim 7, wherein total circulating quantity is adjustable by degree of separation of the cyclone which is changeable by fittings.

* * * * *